(12) United States Patent
Mukherjee et al.

(10) Patent No.: US 10,757,408 B2
(45) Date of Patent: Aug. 25, 2020

(54) RESTORATION IN VIDEO CODING USING DOMAIN TRANSFORM RECURSIVE FILTERS

(71) Applicant: GOOGLE LLC, Mountain View, CA (US)

(72) Inventors: Debargha Mukherjee, Cupertino, CA (US); Yue Chen, Sunnyvale, CA (US); Sarah Parker, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 69 days.

(21) Appl. No.: 15/789,400

(22) Filed: Oct. 20, 2017

(65) Prior Publication Data

US 2018/0160117 A1 Jun. 7, 2018

Related U.S. Application Data

(60) Provisional application No. 62/428,718, filed on Dec. 1, 2016.

(51) Int. Cl.
*H04N 11/02* (2006.01)
*H04N 19/117* (2014.01)
(Continued)

(52) U.S. Cl.
CPC ........... *H04N 19/117* (2014.11); *H04N 19/14* (2014.11); *H04N 19/154* (2014.11);
(Continued)

(58) Field of Classification Search
CPC .................................................. H04N 19/117
(Continued)

(56) References Cited

U.S. PATENT DOCUMENTS

| 4,539,690 | A | * | 9/1985 | Speidel | H04L 25/03057 |
| | | | | | 333/18 |
| 4,652,907 | A | * | 3/1987 | Fling | H03H 21/0012 |
| | | | | | 348/620 |
| 4,698,672 | A | * | 10/1987 | Chen | H03M 7/42 |
| | | | | | 358/1.9 |
| 5,150,432 | A | * | 9/1992 | Ueno | H04N 19/00 |
| | | | | | 348/438.1 |

(Continued)

FOREIGN PATENT DOCUMENTS

EP 2249572 A1 11/2010

OTHER PUBLICATIONS

International Search Report and Written Opinion in PCT/US2017/054331, dated Dec. 13, 2017.
(Continued)

*Primary Examiner* — Leron Beck
(74) *Attorney, Agent, or Firm* — Young Basile Hanlon & MacFarlane, P.C.

(57) ABSTRACT

Restoring a degraded tile of a degraded frame resulting from reconstruction is disclosed. A method includes, for a scaling factor of at least some scaling factors, recursively filtering the degraded tile using the scaling factor to generate a respective restored tile, and determining a respective error for the respective restored tile with respect to the source tile. The method also includes selecting an optimal scaling factor from the at least some scaling factors and encoding, in an encoded bitstream, a scaling parameter based on the optimal scaling factor. The optimal scaling factor corresponding to a smallest respective error. An apparatus includes a processor and non-transitory memory storing instructions. The instructions cause the processor to determine, from an encoded bitstream, a scaling factor, which determines how strongly edges in the degraded tile affect filtering operations, and recursively filter, resulting in a restored tile, the degraded tile using the scaling factor.

16 Claims, 9 Drawing Sheets

(51) Int. Cl.
| | |
|---|---|
| *H04N 19/14* | (2014.01) |
| *H04N 19/82* | (2014.01) |
| *H04N 19/86* | (2014.01) |
| *H04N 19/192* | (2014.01) |
| *H04N 19/174* | (2014.01) |
| *H04N 19/46* | (2014.01) |
| *H04N 19/154* | (2014.01) |
| *H04N 19/176* | (2014.01) |
| *H04N 19/895* | (2014.01) |

(52) U.S. Cl.
CPC ......... *H04N 19/174* (2014.11); *H04N 19/176* (2014.11); *H04N 19/192* (2014.11); *H04N 19/46* (2014.11); *H04N 19/82* (2014.11); *H04N 19/86* (2014.11); *H04N 19/865* (2014.11); *H04N 19/895* (2014.11)

(58) Field of Classification Search
USPC ........................................ 375/240.01–240.29
See application file for complete search history.

(56) References Cited

U.S. PATENT DOCUMENTS

| | | | | |
|---|---|---|---|---|
| 5,610,657 | A * | 3/1997 | Zhang | H04N 19/503 375/240.16 |
| 9,723,330 | B2 * | 8/2017 | Xu | H04N 19/70 |
| 2005/0207670 | A1 * | 9/2005 | Lesellier | H04N 19/86 382/275 |
| 2006/0110065 | A1 * | 5/2006 | Huang | G06T 5/002 382/275 |
| 2007/0064815 | A1 * | 3/2007 | Alvarez | H04N 19/615 375/240.29 |
| 2007/0092000 | A1 | 4/2007 | Chen et al. | |
| 2010/0061651 | A1 * | 3/2010 | Mishima | G06T 5/20 382/265 |
| 2010/0091127 | A1 * | 4/2010 | Hampton | G06K 9/20 348/222.1 |
| 2012/0308104 | A1 * | 12/2012 | Yang | G06T 5/002 382/131 |
| 2013/0235931 | A1 * | 9/2013 | Su | H04N 19/46 375/240.12 |
| 2013/0286288 | A1 * | 10/2013 | Zhang | H04N 5/213 348/608 |
| 2016/0323583 | A1 * | 11/2016 | Kadoto | H04N 19/172 |

OTHER PUBLICATIONS

Gastal et al.; "Domain Transform for Edge-Aware Image and Video Processing"; in ACM Transactions on Graphics, vol. 30 (2011), No. 4, Proceedings of SIGGRAPH 2011, Article 69; pp. 1-11.

Bankoski, et al., "Technical Overview of VP8, An Open Source Video Codec for the Web", Jul. 11, 2011, 6 pp.
Bankoski et al, "VP8 Data Format and Decoding Guide", Independent Submission RFC 6389, Nov. 2011, 305 pp.
Bankoski et al, "VP8 Data Format and Decoding Guide draft-bankoski-vp8-bitstream-02", Network Working Group, Internet-Draft, May 18, 2011, 288 pp.
Series H: Audiovisual and Multimedia Systems, Coding of moving video: Implementors Guide for H.264: Advanced video coding for generic audiovisual services, International Telecommunication Union, Jul. 30, 2010, 15 pp.
"Introduction to Video Coding Part 1: Transform Coding", Mozilla, Mar. 2012, 171 pp.
"Overview VP7 Data Format and Decoder", Version 1.5, On2 Technologies, Inc., Mar. 28, 2005, 65 pp.
Series H: Audiovisual and Multimedia Systems, Infrastructure of audiovisual services—Coding of moving video, Advanced video coding for generic audiovisual services, International Telecommunication Union, Version 11, Mar. 2009. 670 pp.
Series H: Audiovisual and Multimedia Systems, Infrastructure of audiovisual services—Coding of moving video, Advanced video coding for generic audiovisual services, International Telecommunication Union, Version 12, Mar. 2010, 676 pp.
Series H: Audiovisual and Multimedia Systems, Infrastructure of audiovisual services—Coding of moving video, Amendment 2: New profiles for professional applications, International Telecommunication Union, Apr. 2007, 75 pp.
Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.
Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.
Series H: Audiovisual and Multimedia Systems, Infrastructure of audiovisual services—Coding of moving video, Advanced video coding for generic audiovisual services, Version 1, International Telecommunication Union, May 2003, 282 pp.
Series H: Audiovisual and Multimedia Systems, Infrastructure of audiovisual services—Coding of moving video, Advanced video coding for generic audiovisual services, Version 3, International Telecommunication Union, Mar. 2005, 343 pp.
"VP6 Bitstream and Decoder Specification", Version 1.02, On2 Technologies, Inc., Aug. 17, 2006, 88 pp.
"VP6 Bitstream and Decoder Specification", Version 1.03, On2 Technologies, Inc., Oct. 29, 2007, 95 pp.
"VP8 Data Format and Decoding Guide, WebM Project", Google On2, Dec. 1, 2010, 103 pp.

* cited by examiner

US 10,757,408 B2

RESTORATION IN VIDEO CODING USING DOMAIN TRANSFORM RECURSIVE FILTERS

CROSS-REFERENCE TO RELATED APPLICATION(S)

This application claims priority to and the benefit of U.S. Provisional Application Patent Ser. No. 62/428,718, filed Dec. 1, 2016, the entire disclosure of which is hereby incorporated by reference.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

Encoding using compression may be performed by breaking frames or images into blocks or tiles that are then compressed, often using encoding techniques that result in loss of some data. A decoder may apply one or more filters to a reconstructed frame in order to remove or smooth out artifacts caused by (e.g., lossy) encoding.

SUMMARY

The disclosure relates in general to video coding, and in particular to loop restoration using domain transform recursive filters.

One aspect of the disclosed implementations is a method for restoring a degraded tile of a degraded frame resulting from reconstruction of a source tile. The method includes, for a scaling factor of at least some scaling factors, recursively filtering the degraded tile using the scaling factor to generate a respective restored tile, and determining a respective error for the respective restored tile with respect to the source tile. The method also includes selecting an optimal scaling factor from the at least some scaling factors and encoding, in an encoded bitstream, a scaling parameter based on the optimal scaling factor. The optimal scaling factor corresponds to a smallest respective error.

Another aspect is an apparatus for restoring a degraded tile of a degraded frame resulting from reconstruction of a source tile. The apparatus includes a processor and non-transitory memory storing instructions. The instructions cause the processor to determine a first error with respect to the source tile, the first error corresponding to applying a domain transform recursive filter using a first scaling factor to the degraded tile, determine a second error with respect to the source tile, the second error corresponding to applying the domain transform recursive filter using a second scaling factor to the degraded tile, and encode, in an encoded bitstream, the one of the first scaling factor and the second scaling factor corresponding to whichever of the first error and the second error is smaller.

Another aspect is an apparatus for restoring a degraded tile of a degraded frame resulting from a decoder reconstruction. The apparatus includes a processor and non-transitory memory storing instructions. The instructions cause the processor to determine, from an encoded bitstream, a scaling factor, and to recursively filter the degraded tile using the scaling factor to result in a restored tile. The scaling factor determines how strongly edges in the degraded tile affect filtering operations.

These and other aspects of the present disclosure are disclosed in the following detailed description of the embodiments, the appended claims, and the accompanying figures.

BRIEF DESCRIPTION OF THE DRAWINGS

The description herein makes reference to the accompanying drawings wherein like reference numerals refer to like parts throughout the several views unless otherwise noted.

DETAILED DESCRIPTION

Figure 1:
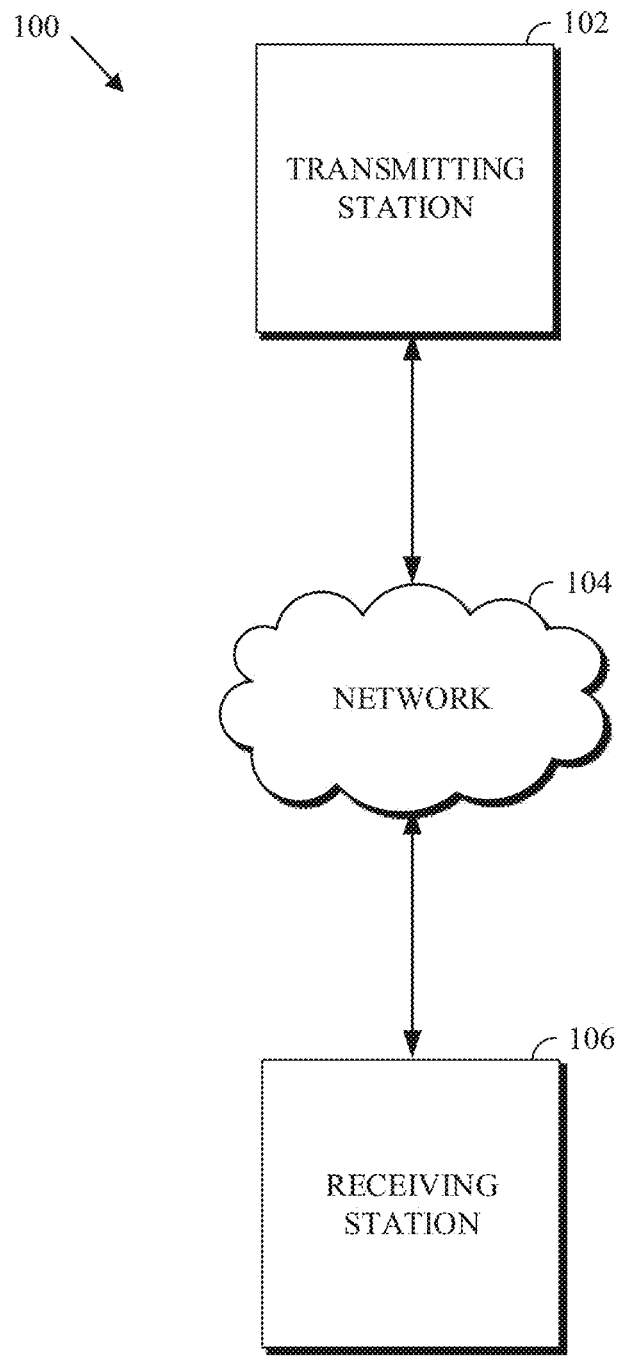
FIG. 1 is a schematic of a video encoding and decoding system.

As mentioned above, compression schemes related to coding video streams may include breaking images into blocks and generating a digital video output bitstream using one or more techniques to limit the information included in the output. A received bitstream can be decoded to re-create the blocks and the source images from the limited information. Encoding a video stream, or a portion thereof, such as a frame or a block, can include using temporal or spatial similarities in the video stream to improve coding efficiency. For example, a current block of a video stream may be encoded based on identifying a difference (residual) between the previously-coded pixel values and those in the current block. In this way, only the residual and parameters used to generate it need be added to the bitstream instead of including the entirety of the current block. The residual may be encoded using a lossy quantization step. Decoding (i.e., reconstructing) an encoded block from such a residual often results in a distortion between the original and the reconstructed block.

Post-reconstruction loop filters may be used in various ways to improve reconstructed frames, which may be distorted or degraded as a result of the encoding and decoding processes. For example, in-loop deblocking filters can be used to modify pixel values near borders between blocks to limit the visibility of those borders within the reconstructed frame. Other loop filters may be used to bring the reconstructed images closer to the source images by, for example, adding offsets (e.g., determined at the encoder) to pixel values of the reconstructed frame. Such loop filters may operate in a blind setting (i.e., without access to both a source frame and its associated reconstructed frame).

According to the teachings herein, access to both the source and reconstructed frames at an encoder can make it possible for the encoder to send information that can guide a decoder into achieving superior restoration. Among other things, restoration using domain transform recursive filters is described. A domain transform recursive filter transforms a reconstructed frame from the pixel domain to a different domain (e.g., the gradient domain) and successively applies an edge-preserving smoothing filter in the different domain. The domain transform recursive filter can result in edge-preserved de-noised frame (i.e., a restored frame) that is closer to the source frame than the reconstructed frame. That is, the difference between the restored frame and the source frame can be smaller than the difference between the source frame and the reconstructed frame. The restored frame is smoothed where there are no edges and edges are preserved (i.e., edges are not smoothed to any significant degree). Restoration parameters for a filtering formula based on the frame differences may be encoded and signaled to the decoder. The restoration described herein may be implemented in a switchable restoration framework, which refers to the ability to switch between different restoration techniques or types for different portions of a reconstructed frame. Using the techniques described herein, various systematic errors (such as DC shifts in flat regions of frames), or color bias, may be removed or at least partially compensated so the restored image can be brought closer to the source image.

Restoration using domain transform recursive filters is described herein first with reference to a system in which the teachings may be incorporated. As alluded to above, in the restoration herein, the frame may be restored in one or more portions. Each of these portions is referred to herein respectively as a "tile," where tiles may or may not overlap each other. A tile may or may not correspond to the borders of blocks described herein, but the encoding and decoding of blocks described herein also applies to tiles.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
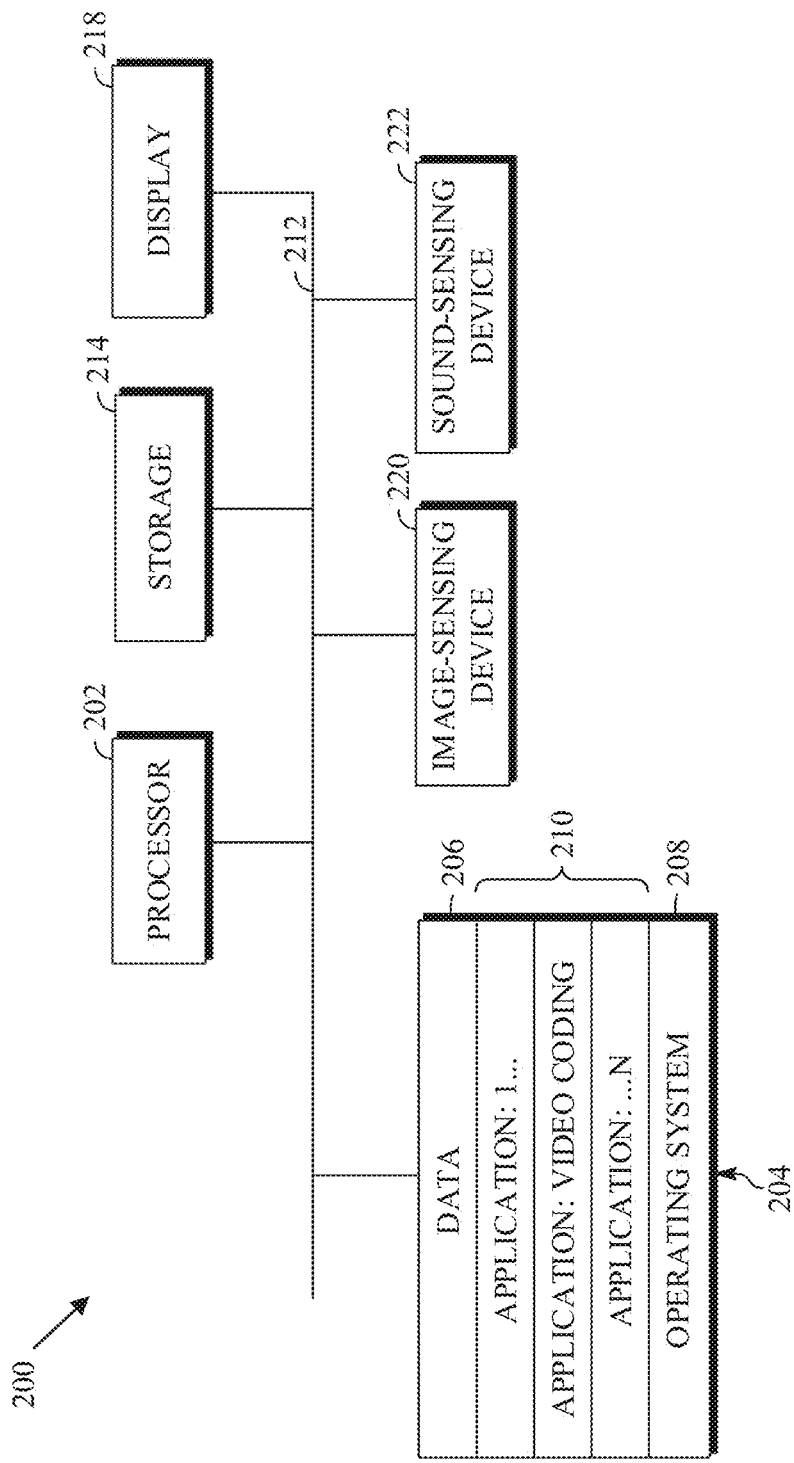
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A processor 202 in the computing device 200 can be a central processing unit (CPU). Alternatively, the processor 202 can be any other type of device, or multiple devices, capable of manipulating or processing information now-existing or hereafter developed. Although the disclosed implementations can be practiced with a single processor as shown, e.g., the processor 202, advantages in speed and efficiency can be achieved using more than one processor.

A memory 204 in the computing device 200 can be a read-only memory (ROM) device or a random access memory (RAM) device in an implementation. Any other suitable type of storage device can be used as the memory 204. The memory 204 can include code and data 206 that is accessed by the processor 202 using a bus 212. The memory 204 can further include an operating system 208 and application programs 210, the application programs 210 including at least one program that permits the processor 202 to perform the methods described here. For example, the application programs 210 can include applications 1 through N, which further include a video coding application that performs the methods described here. The computing device 200 can also include a secondary storage 214, which can, for example, be a memory card used with a computing device 200 that is mobile. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the processor 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the processor 202 and the memory 204 of the computing device 200 as being integrated into a single unit, other configurations can be utilized. The operations of the processor 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
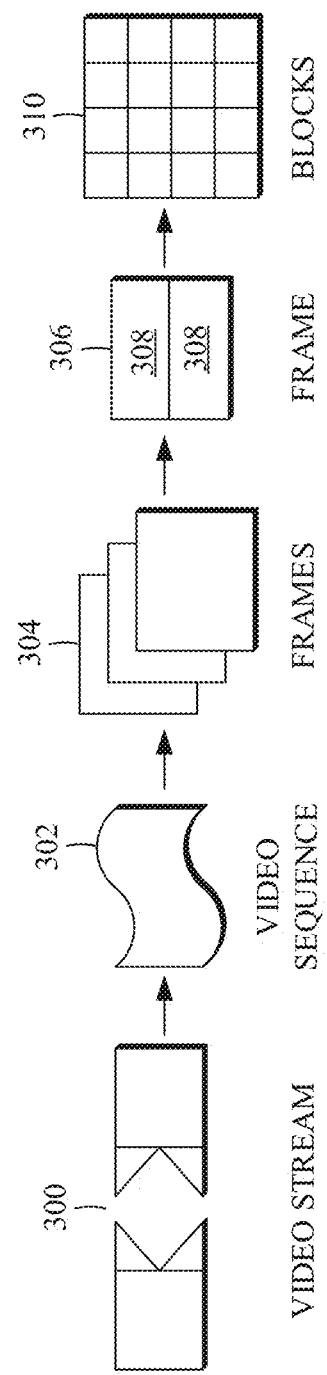
FIG. 3 is a diagram of a video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of segments 308 or planes. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels or larger.

Figure 4:
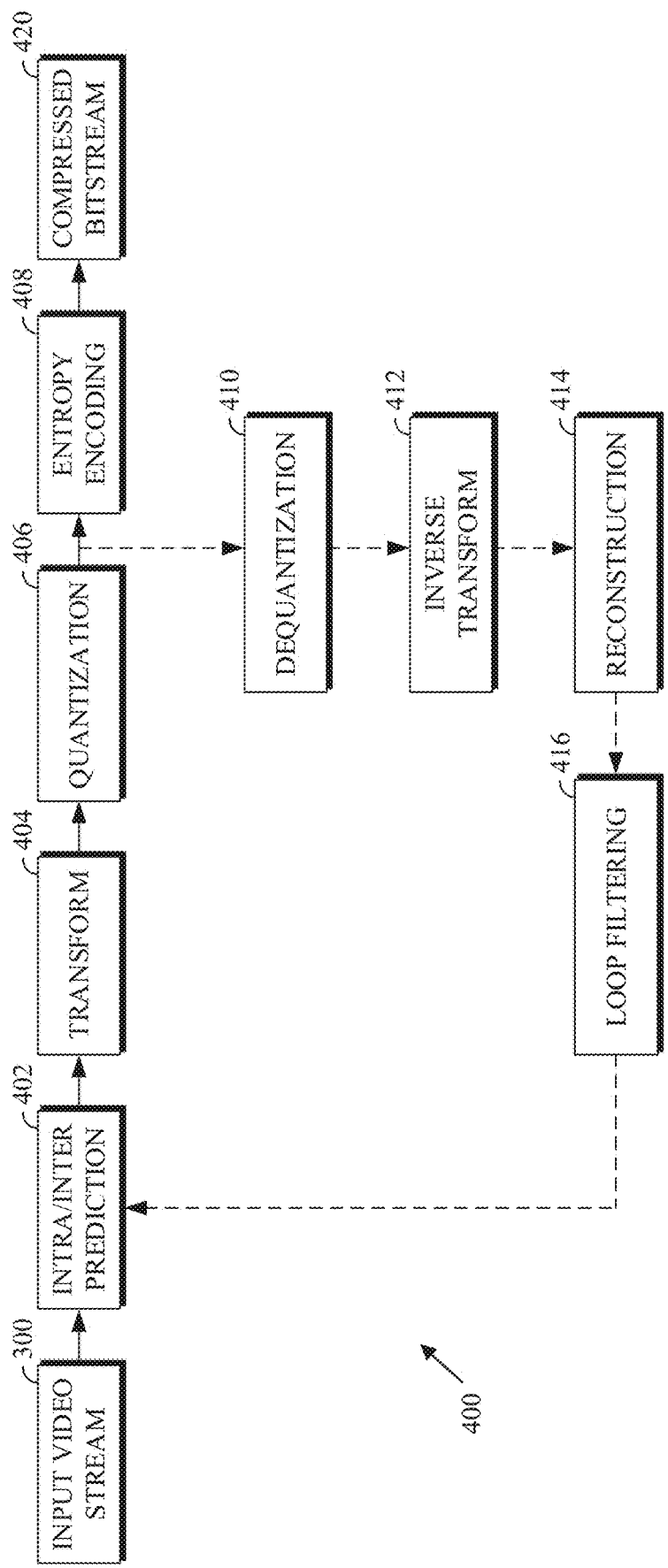
FIG. 4 is a block diagram of an encoder according to implementations of this disclosure.

FIG. 4 is a block diagram of an encoder 400 in accordance with implementations of this disclosure. The encoder 400 can be implemented, as described above, in the transmitting station 102 such as by providing a computer software program stored in memory, for example, the memory 204. The computer software program can include machine instructions that, when executed by a processor such as the processor 202, cause the transmitting station 102 to encode video data in the manner described herein. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter prediction stage 402, a block can be encoded using intra-frame prediction (also called intra-prediction) or inter-frame prediction (also called inter-prediction), or a combination both. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames determined using motion vectors.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient is at the top-left of the matrix and the highest frequency coefficient can be at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames and blocks to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage. Additionally, or alternatively, the encoder 400 includes a deblocking filtering stage in addition to the loop filtering stage 416, or the functions of these filtering stages may be combined.

Figure 5:
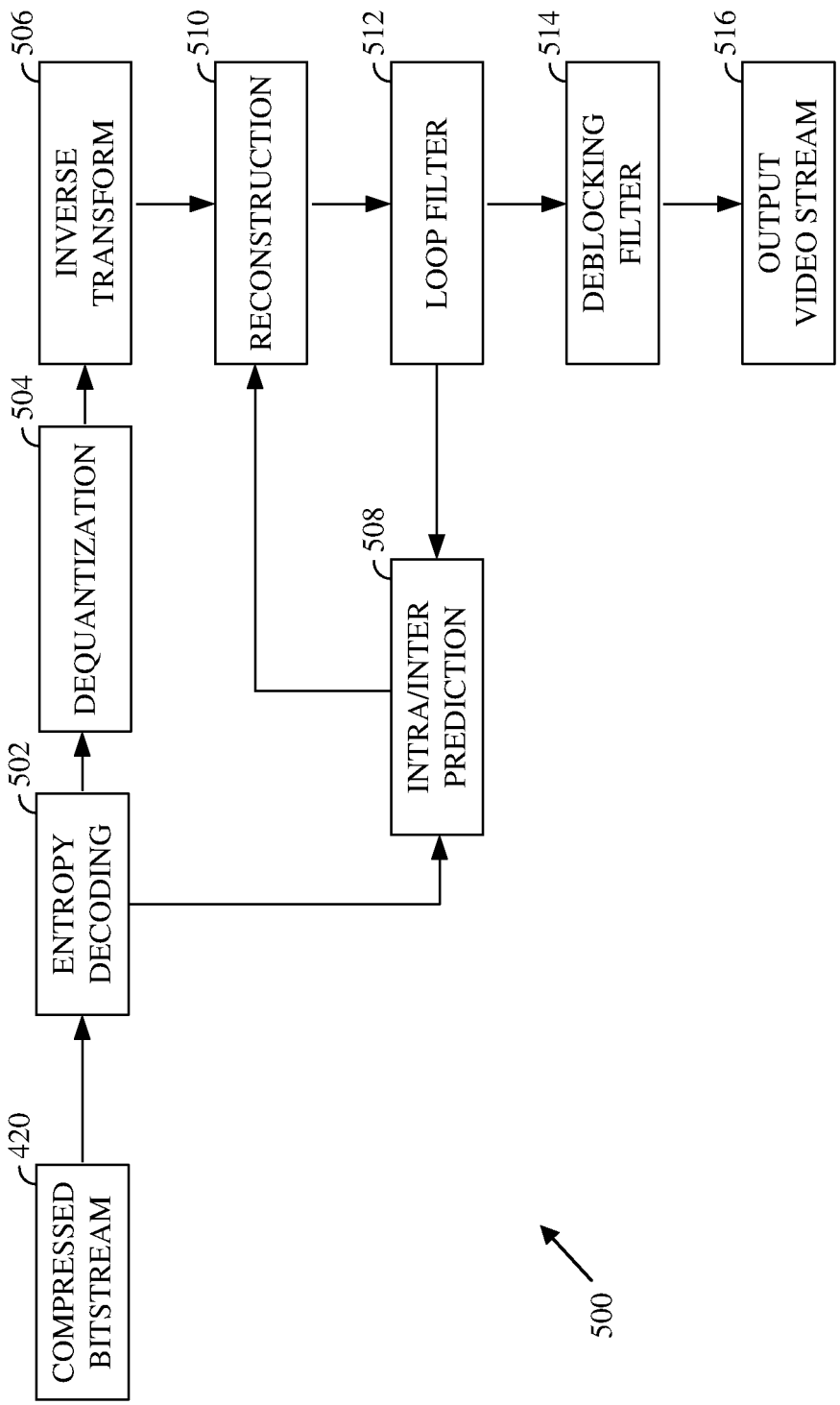
FIG. 5 is a block diagram of a decoder according to implementations of this disclosure.

FIG. 5 is a block diagram of a decoder 500 in accordance with implementations of this disclosure. The decoder 500 can be implemented in the receiving station 106, for example, by providing a computer software program stored in the memory 204. The computer software program can include machine instructions that, when executed by a processor such as the processor 202, cause the receiving station 106 to decode video data in the manner described herein. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce distortion as described below. Other filtering can be applied to the reconstructed block. In this example, the deblocking filtering stage 514 is applied to the reconstructed block to reduce blocking artifacts, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. In some implementations of the decoder 500, the deblocking filtering stage 514 is applied before the loop filtering stage 512, and hence before the filtering described herein. The functions of the filtering stages may be combined in a single stage.

Figure 6:
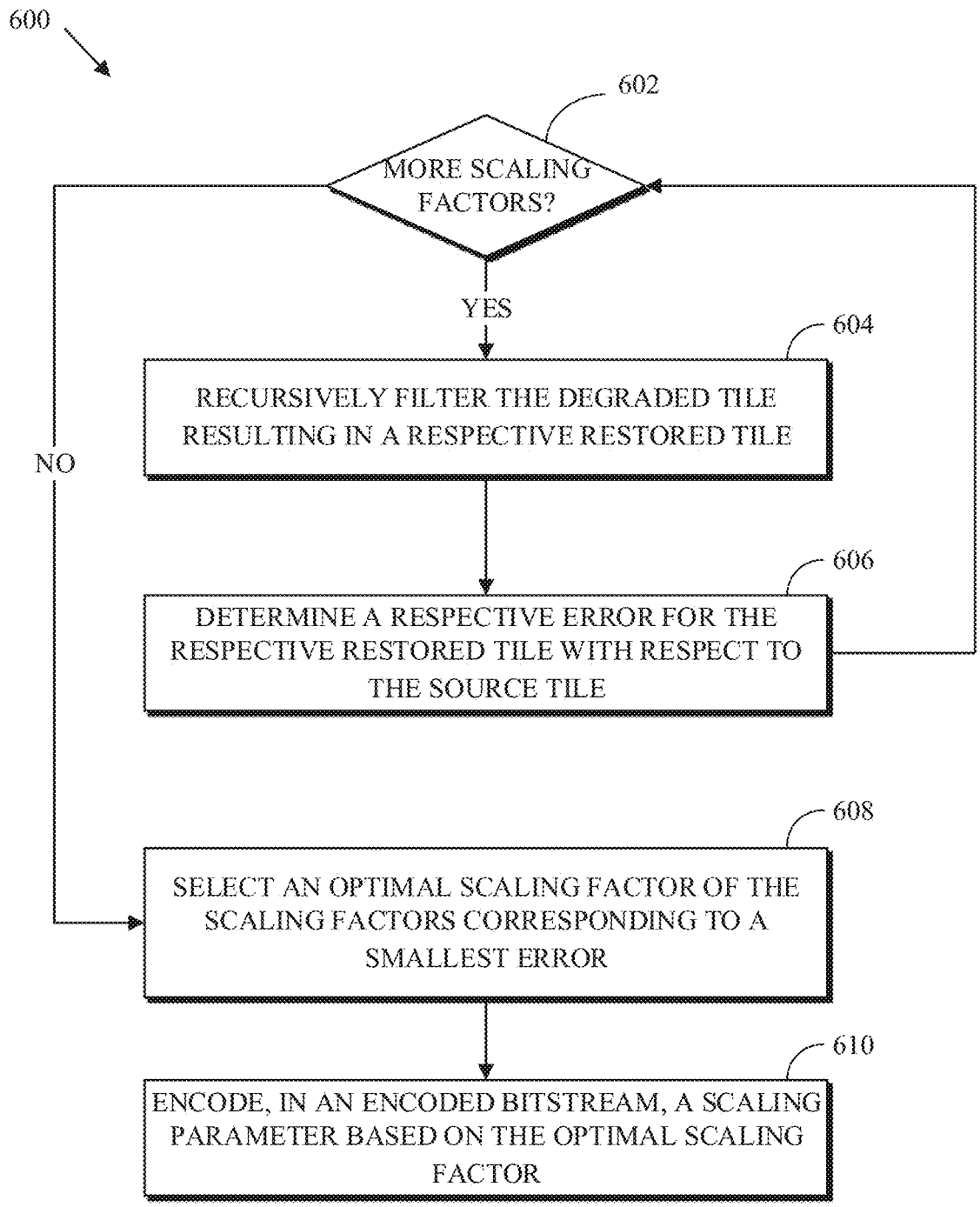
FIG. 6 is a flowchart diagram of a process for restoring a degraded tile of a degraded frame at an encoder according to an implementation of this disclosure.

FIG. 6 is a flowchart diagram of a process 600 for restoring a degraded tile of a degraded frame at an encoder according to an implementation of this disclosure. The process 600 can be implemented in an encoder such as the encoder 400 and can be implemented, for example, as a software program that can be executed by computing devices such as transmitting station 102. The software program can include machine-readable instructions that can be stored in a memory such as the memory 204 or the secondary storage 214, and that can be executed by a processor, such as processor 202, to cause the computing device to perform the process 600. In at least some implementations, the process 600 can be performed in whole or in part by the loop filtering stage 416 of the encoder 400. The process 600 can also be performed in whole in part after the loop filtering stage 416 of the encoder 400.

The process 600 can be implemented using specialized hardware or firmware. Some computing devices can have multiple memories, multiple processors, or both. The steps or operations of the process 600 can be distributed using different processors, memories, or both. Use of the terms "processor" or "memory" in the singular encompasses computing devices that have one processor or one memory as well as devices that have multiple processors or multiple memories that can be used in the performance of some or all of the recited steps.

Although not expressly shown, the process 600 initially receives a degraded tile of a corresponding source tile of a source frame. The degraded tile can be, for example, all or a portion of a reconstructed frame from a reconstruction loop of an encoder. That is, the degraded tile can be co-extensive with the reconstructed frame or can be smaller than the reconstructed frame. Herein, the reconstructed frame is referred to as a degraded frame so as to distinguish it from the final reconstructed (i.e., restored) frame after filtering. For example, all or a portion of the degraded frame could be received from the reconstruction stage 414 at the loop filtering stage 416 of the encoder 400. The degraded frame from the reconstruction stage 414 can be deblocked before the process 600 occurs.

The process 600 can receive the entire degraded frame and partition the frame into one or more degraded tiles or can receive degraded tiles as partitioned at a previous stage of the encoder. That is, the process 600 can partition a degraded frame into tiles. Alternatively, the process 600 processes whatever unit of a frame (whether a tile or the frame itself) is received.

The size of each tile can be selected based on a tradeoff between localization of the statistical properties of the degraded frame and the number of bits to be used in the encoded bitstream. For example, if a smaller tile size is selected, better localization may be achieved; however, a higher number of bits may be used for encoding the degraded frame. Alternatively, tile sizes can be selected independent of statistical properties of the frame, such as by reference to the degraded frame size. For example, if the frame size is greater than 256×256 pixels, the tile size can be set to 256×256 pixels; otherwise, the tile size is set to 120×120 pixels. The tile size can be selected based on the frame size exceeding a threshold value. The tile size can be set to the size of the frame such that the frame includes only one tile. Other ways of selecting tile sizes can be used with implementations of this disclosure. As such, in an example, the process 600 can receive the reconstructed frame and partition it into tiles. The process 600 can select a size (i.e., a first size) for the degraded tile based on the size (i.e., a second size) of the degraded frame. As described above, if the second size is greater than 256×256 pixels, the process 600 can set the first size to 256×256 pixels. If the second size is less or equal to 256×256 pixels, the process 600 can set the first size to 120×120 pixels. Setting the tile size can mean partitioning the reconstructed (i.e., degraded) frame into tiles such that at least one of the tiles has the tile size.

The process 600 determines an optimal scaling factor s to use for the domain transform recursive filtering of the degraded tile. The optimal scaling factor is determined by testing several scaling factors. An optimal scaling factor is a scaling factor, among the several scaling factors, that results in the restored tile that is closest to the source tile. The scaling factor s can be a function of two parameters: a desired filter variance over the spatial domain (i.e., the pixel locations of the pixels of the degraded tile) and a desired filter variance over the signal range (i.e., a range of pixel values and/or color component values of the degraded tile). The desired filter variance over the spatial domain can be represented by the spatial domain standard deviation $\sigma_s$, which controls the space size of the filter kernel. The desired filter variance over the range is represented by the signal range standard deviation $\sigma_r$ which determines how strongly edges affect the filtering operations. The scaling factor s is given by equation (1):

$$s = \sigma_s / \sigma_r \qquad (1)$$

While it is possible to change values for each of these variables, fixing one to a specific value allows for simpler calculations. That is, scaling factors can be selected by fixing one of the filter variance over a spatial domain and the filter variance over a range of the pixel values of the degraded tile and varying the other. In the examples herein, the spatial domain standard deviation $\sigma_s$ is fixed, and different values of the signal range standard deviation $\sigma_r$ are tested to determine which signal range standard deviation $\sigma_r$ results in the best restored tile. For example, the spatial domain standard deviation $\sigma_s$ can be set to $\sqrt{2}$. The values for the signal range standard deviation $\sigma_r$ to be tested can be selected from a finite number of values. As the signal range standard deviation $\sigma_r$ can fall along a continuum including non-integer numbers, it can be quantized into any number of values, such as 32, 128, 64, or more or fewer values. The quantization level can depend on the available number of bits for encoding a value for the signal range standard deviation $\sigma_r$ in the encoded bitstream to be received by a decoder. For example, if 6 bits are available, then 64 values for the signal range standard deviation $\sigma_r$ can be tested. Alternatively, different scaling factors s may be selected such that the signal range standard deviation $\sigma_r$ varies.

At 602, the process 600 determines whether more scaling factors are available for testing the current degraded tile from a plurality of scaling factors. If more values are available, then process 600 selects a value and control passes to 604; otherwise control passes to 608. Selecting a scaling value can mean selecting a value for the signal range standard deviation $\sigma_r$. The process 600 can exhaustively test every possible quantized value of the signal range standard deviation $\sigma_r$. That is, if 64 values are available, then every one of the 64 values is tested. Alternatively, the process 600 can test some scaling factors of the possible quantized scaling factors. For example, the process 600 can perform a segmentation (i.e., a coarse search) algorithm. For example, the process 600 can test every eighth value. From among the tested values, the process 600 selects the value resulting in the best restored tile and continues the search around the selected value. Alternatively, instead of searching for an optimal value of the range standard deviation $\sigma_r$, the process 600 may select from a defined number of values for the scaling factor s.

At 604, the process 600 recursively filters the degraded tile resulting in a restored tile. In an example herein, recursive filtering is performed using a technique described in part in Eduardo S. L. Gastal and Manuel Oliveira. "Domain transform for Edge-Aware Image and Video Processing," in ACM Transactions on Graphics, Volume 30 (2011). Number 4, Proceedings of SIGGRAPH 2011 Article 69, which is incorporated herein in its entirety by reference.

Figure 7:
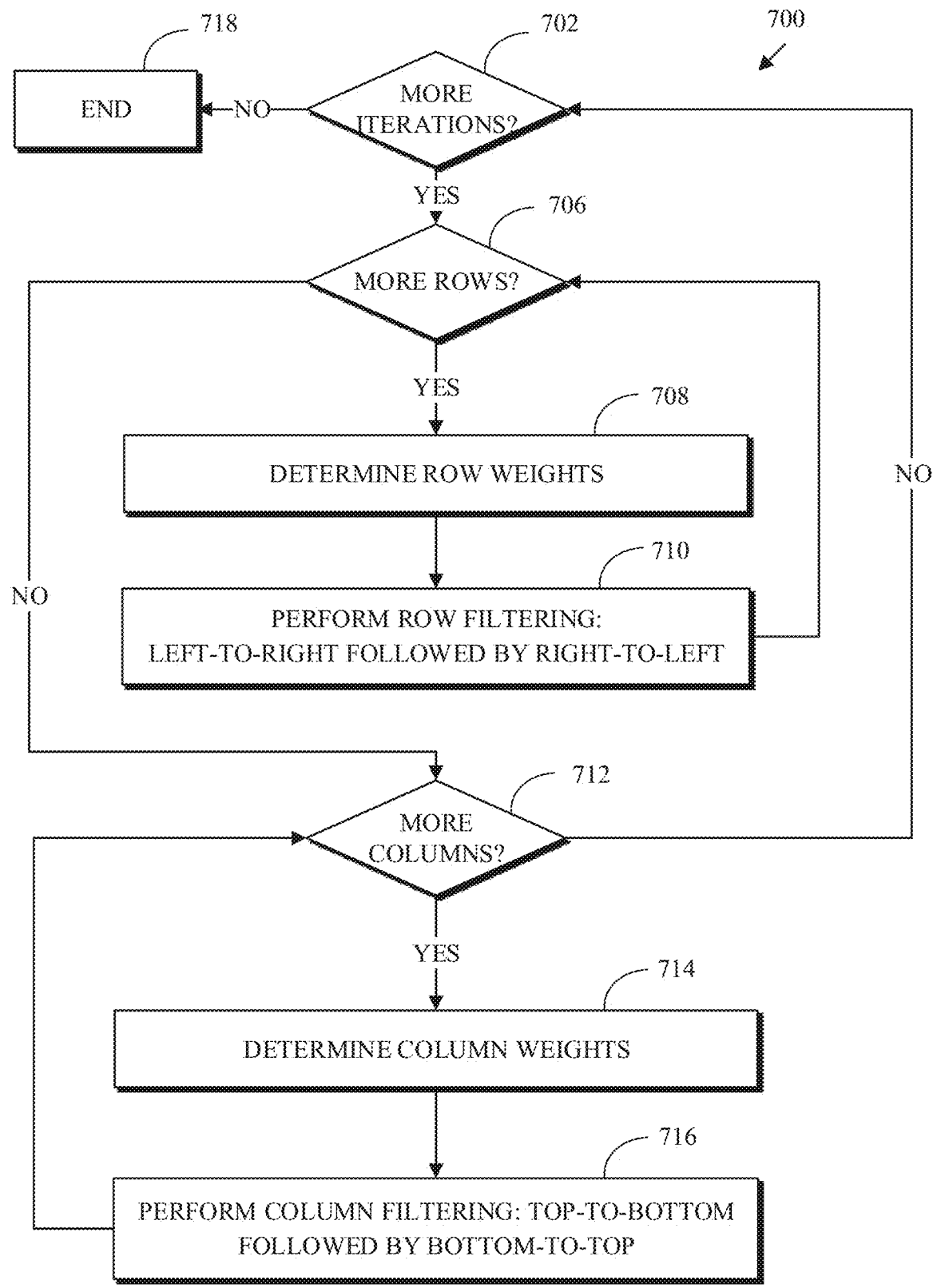
FIG. 7 is a flowchart diagram of a process for recursively filtering a degraded tile according to an implementation of this disclosure.

FIG. 7 is a flowchart diagram of a process 700 for recursively filtering a degraded tile according to an implementation of this disclosure. The process 700 illustrates an implementation of recursively filtering a degraded tile at 604 of the process 600 of FIG. 6. Inputs to the process 700 can include a scaling factor, a range standard deviation $\sigma_r$, a spatial domain standard deviation $\sigma_s$, or a combination thereof. The process 700 transforms a tile from the pixel domain to the gradient domain, performs a recursive operation on the transformed tile, and converts the tile back to the pixel domain. The process 700 repeats for T number of iterations (i.e., a predetermined number of iterations). Each iteration consists of two parts as described below: a row filtering operation part and a column filtering operation part. For an iteration number of the predetermined number of iterations, the process 700 can determine row weights using the scaling factor and the iteration number, perform a row filtering operation on rows of the degraded tile, determine column weights using the scaling factor and the iteration number, and perform a column filtering operation on columns of the degraded tile.

The process 700 applies one-dimensional (1D) filters along each dimension of an image tile. The horizontal dimension is processed one row at a time. The vertical dimension is processed one column at a time. Several passes (i.e., iterations) are desirably used in order to eliminate visual effects, such as striping effects, in the restored tile.

Processing of the dimensions is interleaved. For example, the horizontal dimension for each pass or iteration is processed before the vertical dimension. While the number of passes can be more or less than three, it has been observed that three passes produces acceptable results.

In each iteration, the process 700 processes a tile row-by-row. For each row, the process 700 applies a left-to-right filtering operation followed by a right-to-left filtering operation. The process 700 then processes the tile column-by-column. For each column, the process 700 applies a top-to-bottom filtering operation followed by a bottom-to-top filtering operation. The result of applying a filtering operation is used in applying the next filtering operation. The process 700 is described with reference to FIG. 8.

Figure 8:
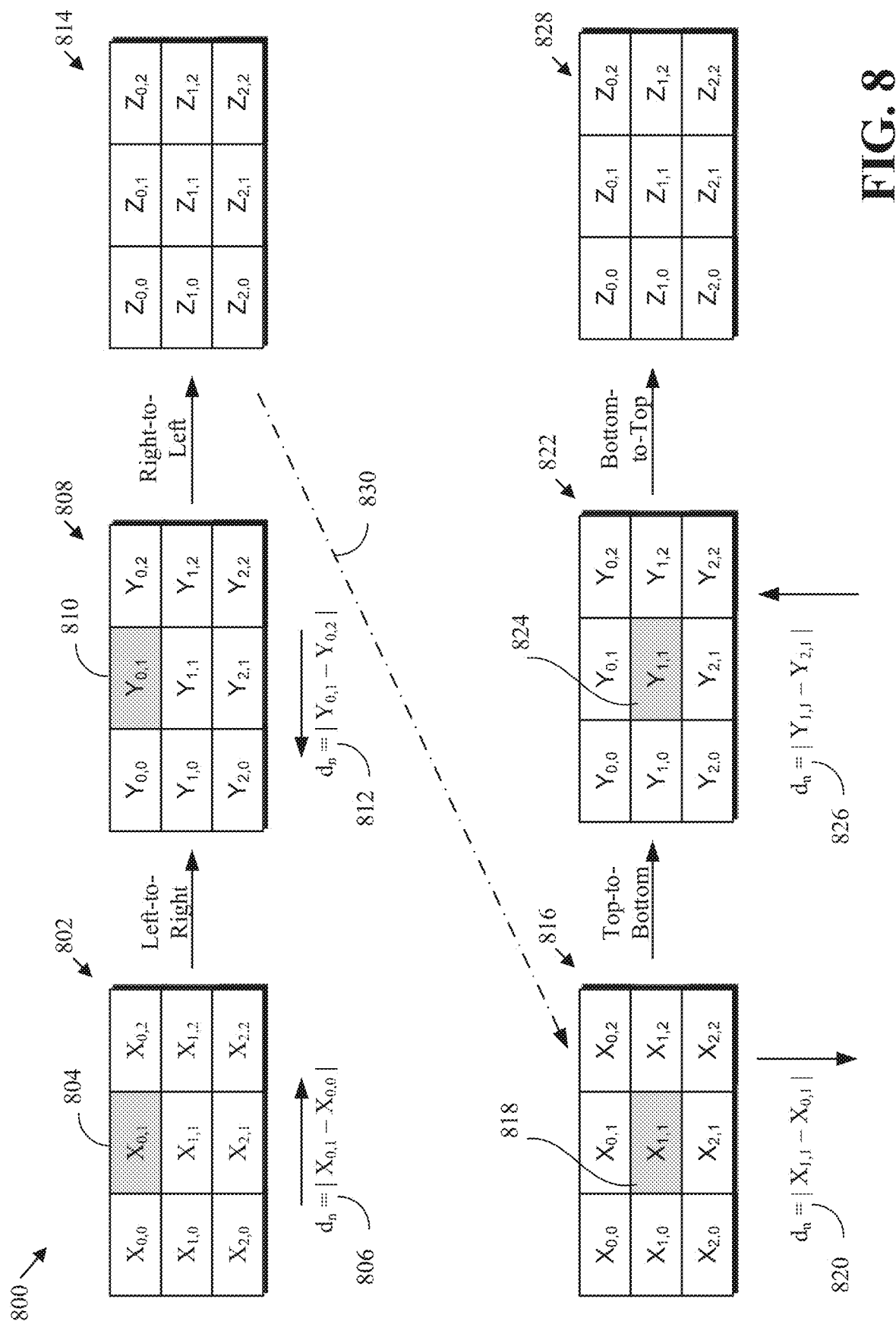
FIG. 8 is an illustration of recursive filtering of a 3×3 pixel tile according to implementations of this disclosure.

FIG. 8 is an illustration 800 of recursive filtering of a 3×3 pixel tile according to implementations of this disclosure. FIG. 8 illustrates a degraded tile 802. The process 700, upon completion, results in a restored tile 828. As described above, the restored tile 828 can replace the degraded tile 802 as the reconstructed tile.

At 702, the process 700 determines whether more iterations are still available. If all iterations have been executed, then the process 700 ends at 718; otherwise, the process 700 advances to 706 to determine whether there are any rows in the current degraded tile to be filtered in the current iteration. As indicated above, the process 700 can be executed for a defined (e.g., predetermined) number of iterations T. While the process 700 is described below as performing the filtering in a certain direction first (i.e., horizontally and row by row), that need not be the case. For example, the process 700 can first perform column-wise filtering before performing row-wise filtering.

For each row in the degraded tile, the process 700 executes 708-710. As the degraded tile 802 in FIG. 8 is illustrated to have three (3) rows, then the process 700 executes 708-710 three (3) times in this example.

At 708, the process 700 determines row weights for the row that is the subject of a current iteration. The row weights are given by the weights $a_{n,i}$ where n corresponds to a pixel location and i corresponds to the iteration number of the current iteration. The filtering operation described herein depends on the weights $a_{n,i}$. In some filtering techniques, the filtering coefficients (i.e., weights) may be constant for every pixel. However, as described below, the filtering weights $a_{n,i}$ herein vary depending on a gradient $d_n$ at the pixel location n and on the iteration number i.

As described below, the filtering operations are performed in the gradient domain. The weights $a_{n,i}$ are designed such that, even though the filtering operations are performed in the gradient domain, the values of the restored tile are in the pixel domain when the process 700 ends. The row weights $a_{n,i}$ are determined using equation (2):

$$a_{n,i} = a_i^{s \cdot d_n} \qquad (2)$$

In equation (2), s is the scaling factor selected at 602 of FIG. 6, the gradient $d_n$ is an estimate of the local gradient at the $n^{th}$ pixel location for the 1D signal to be filtered, i is the iteration number of 702, and $a_i$ is an iteration filter standard deviation. The iteration filter standard deviation $a_i$ is given by equation (4). While other measures and/or values for the gradient can be used, in the examples described herein, the gradient $d_n$ is the absolute pixel difference of I[n] (i.e., the pixel value of the pixel at the $n^{th}$ location of a row) and I[n−1] (i.e., the pixel value of the pixel at $(n-1)^{st}$ location of the same row) in the direction of filtering as given in equation (3).

$$d_n = |I[n] - I[n-1]| \qquad (3)$$

In another example, a distance of L between pixels can be used when determining the gradient. For example, the gradient $d_n$ can be the absolute pixel difference of the pixel at the $n^{th}$ location of a row and the $(n-L)^{st}$ location of the same row in the direction of filtering.

An example of calculating the gradient $d_n$ is now given. For the pixel at the pixel location 804 of FIG. 8, and when a left-to-right filter is applied, the gradient $d_n$ (e.g., horizontal gradient) is given by the formula 806 as $d_n = |X_{0,1} - X_{0,0}|$. The formula 806 uses the pixel value of the pixel at the pixel location 804 and the value of the pixel to the immediate left of the pixel location 804. The result of applying the left-to-right filter operation is tile 808. A right-to-left filtering operation is then applied using the tile 808. For the pixel at the pixel location 810 (that is, the same pixel location as the pixel location 804), the gradient $d_n$ (e.g., horizontal gradient) is given by equation 812 as $d_n = |Y_{0,1} - Y_{0,2}|$. Equation 812 uses the value of the pixel at the pixel location 810 and the value of the pixel to the immediate right of the pixel location 810. Tile 814 is the result of applying the right-to-left filtering operation. The equation 820, $d_n = |X_{1,1} - X_{0,1}|$, illustrates determining the gradient $d_n$ (e.g., vertical gradient) for the pixel at the pixel location 818 of the tile 816 when performing a top-to-bottom filtering operation. The equation 820 uses the value of the pixel at the pixel location 818 and the value of the pixel immediately above the pixel location 818. Tile 822 is the result of applying the top-to-bottom filtering operation. Equation 826, $d_n = |Y_{1,1} - Y_{2,1}|$, illustrates determining the gradient $d_n$ (e.g., vertical gradient) for the pixel at the pixel location 824 of the tile 822 when performing a bottom-to-top filtering operation. The equation 826 uses the value of the pixel at the pixel location 824 and the value of the pixel immediately below the pixel location 824.

As stated above, the gradient $d_n$ is a measure the gradient at a pixel location with respect to the previous pixel location in the filtering direction. A high gradient value can indicate the existence of an edge in the tile at the pixel location. As such, the weight $a_{n,i}$ at the pixel location can be designed to have an edge-preserving effect (i.e., less filtering). More filtering (i.e., smoothing) can be performed when the gradient value is small.

As indicated above, the iteration filter standard deviation $a_i$ for the i-th iteration (e.g., for the coefficients of the iteration) is given by equation (4):

$$\begin{cases} a_i = \exp(-\sqrt{2/\sigma_H}) \\ \text{where } \sigma_H = \sigma_s \sqrt{3} \, (2^{T-i-1}) / \sqrt{4^T - 1} \end{cases} \qquad (4)$$

In equation (4), T is the number of iterations, i is the iteration number, and $\sigma_s$ is the spatial domain standard deviation.

The weights $a_{n,i}$ may be included in a look up table such that determining the row weights at 708 are determined from the look up table, rather than being calculated. The look up table may be generated by pre-calculating the weights $a_{n,i}$ and storing them with indices for possible values for the range standard deviation $\sigma_r$, iteration numbers, and possible values for the gradient $d_n$. Assuming, without limitation, that the pixel values of a degraded tile, such as the degraded tile 802, are in the range [0,255] (i.e., for 8-bit content), then the gradient $d_n$ values are also in the [0,255] range. That is, there are also 256 possible values for the gradient $d_n$. As described above, the range standard deviation $\sigma_r$ can have 64 values in an example. Also, in the example described above, there is a defined number T of iterations, with three (3) passes or iterations being sufficient. In such a case, the lookup table can include 49,152 entries for the weights $a_{n,i}$ (64 possible values for the range standard deviation $\sigma_r$ multiplied by 3 iteration numbers multiplied by 256 possible values of the gradient $d_n$). This is a relatively small table in codec applications and can be shared with both an encoder and a decoder.

At 708, the process 700 has available both a value of the range standard deviation $\sigma_r$ and the iteration number. In order to lookup a value for a weight $a_{n,i}$, the process 700 determines (i.e., calculates) a gradient $d_n$ value. The process 700 then uses the calculated gradient $d_n$ value, the iteration number i, and the value for the range standard deviation $\sigma_r$ to look up a value for weight $a_{n,i}$ in the lookup table. The weights $a_{n,i}$ may be mapped to the integer domain and stored in the lookup table as integers.

After determining the row weights at 708, the process 700 performs row filtering at 710. The row filtering operation includes a left-to-right filtering operation followed by a right-to-left filtering operation applied to each pixel of a row. The left-to-right filtering operation applies equation (5) to the pixels of a row of the degraded tile 802 of FIG. 8 resulting in the intermediate y[n] values of the tile 808 of FIG. 8.

$$y[0]=x[0]; y[n]=(1-a_{n,i})x[n]+a_{n,i}y[n-1], n=1,2,\ldots,N-1 \quad (5)$$

In equation (5), the row indexes have been omitted. For example, when processing the second row, then y[0] corresponds to Y[1,0] in tile 808 of FIG. 8, x[0] corresponds to X[1,0] in the degraded tile 802, x[n] corresponds to X[1,n], and so on. The first intermediate value y[0] is set to be the same as the first value x[0] of the degraded frame. Subsequent y[n] values are recursively filtered versions of the x[n] value and the previously calculated filtered y[n−1] value.

The right-to-left filtering operation is performed using the result of the left-to-right filtering operation. That is, the right-to-left filtering operation uses the tile 808 of FIG. 8. The right-to-left operation applies equation (6) to the pixels of a row of the tile 808.

$$z[N-1]=y[N-1]; z[n]=(1-a_{n,i})y[n]-a_{n,i}z[n+1], n=N-2,\ldots,0 \quad (6)$$

As can be observed from the equations (2)-(6), when the gradient $d_n$ at pixel n is high, the value of the value of weight $a_{n,i}$ for that pixel is also high. In such a case, the filters of equations (5) and (6) result in selecting more of the pixel itself and less of the previous filtered pixel to include in the resulting filtered pixel value (i.e., weighing the pixel value higher than the previous filtered pixel). Therefore, a higher gradient $d_n$ has an edge-preserving effect. On the other hand, when the gradient value do is small, then more of the value of the previous filtered pixel is included the resulting filtered pixel. That is, the resulting pixel value is smoothed.

At the completion of row filtering at 710, the process 700 returns to 706 to determine if there are remaining rows to filter in the current iteration. When all the rows of the degraded tile are processed in response to the query at 706, the process 700 advances to 712 to determine whether there are any columns remaining to filter in the current iteration. In 712-716, the process 700 performs similar operations as those described with respect to 706-710. That is, column weights are determined at 714 in a similar manner to the determination of row weights at 708, and column filtering from top-to-bottom and bottom-to-top is performed in a similar manner to the row filtering at 710.

While the degraded tile 802 is used as the starting tile for the initial row at 708, the tile 814 is used as a starting tile for the initial column at 714. This is indicated by the dotted line 830 of FIG. 8. That is, the tile 814 and the tile 816 are identical. While the tiles 802, 814, 816, and 828 of FIG. 8 are depicted as separate tiles, the same storage may be used for the X and the Z values. That is, calculated z[n] values replace the corresponding x[n] values. At the completion of the process 700, the tile 828 constitutes the restored tile of the degraded tile 802 of FIG. 8.

The tile 828 of FIG. 8 is the result of completing a single iteration of the process 700. The tile 828 of FIG. 8 is used as the degraded tile 802 of FIG. 8 in the next iteration of the process 700. And at the completion of all iterations of process 700, the resulting tile constitutes the restored tile.

Other filtering techniques, such as ones using a bilateral filter, may require a window of pixels about a pixel being processed. This can result in complex and expensive processing. Contrastingly, each of the left-to-right, right-to-left, top-to-bottom, and bottom-to-top filtering operations described herein is a simple operation that does not require more than the value of the previous pixel. As such, implementations according to this disclosure result in simple and inexpensive processing.

Returning to the process 600 in FIG. 6, an error is determined for the restored tile at 606. The error is determined between the source tile and the restored tile. The error can be a mean squared error between co-located pixel values of the respective tiles. The error can be a sum of absolute differences error between co-located pixel values of the respective tiles. Any other suitable error measure can be used. The process 600 then returns to 602 to determine if any further scaling factors are available for testing. If so, the recursive filtering at 604 and determining the error at 606 are repeated until there are no additional scaling factors to test.

Once all of the scaling factors are tested in the filtering process, the process 600 advances to 608. At 608, the process 600 selects a scaling factor to use for the loop filtering from the available scaling factors. For example, the process 600 can select the scaling factor of the multiple scaling factors that results in the smallest error. Another value for the optimal scaling factor of the plurality of scaling factors tested can be selected as long as it results in a relatively small error compared to the other values for the error.

At 610, the process 600 encodes, in an encoded bitstream, a scaling parameter based on the optimal scaling factor. For example, the process 600 can quantize and encode the signal range standard deviation $\sigma_r$ (i.e., the one of the parameters that was not fixed) corresponding to the optimal scaling factor. Alternatively the process 600 can quantize and encode the scaling factor s.

When the process 600 is performed in whole or in part by the loop filtering stage 416 of the encoder 400, a reconstructed image, formed from reconstructed tiles (in the case where multiple tiles are used for the degraded image) can be used for predicting subsequent frames.

When the degraded frame is formed of multiple degraded tiles, each degraded tile of the multiple degraded tiles can be restored based on a different restoration type. For example, in addition to the domain transform recursive filtering described above, other possible restoration types may include filters based on a filtering and subspace projection self-guided filter, a Wiener filter, or a bilateral filter. For example, multiple restoration types may be tested, and the results compared, to determine which results in the smallest error between the source tile and the restored tile. When multiple restoration types are available, the restoration type for the current tile may also be encoded into the bitstream at 610.

The parameters, and optionally the restoration type, may be encoded into a frame header, a slice header, a segment header, a tile header, a block header, or combinations of these headers. The identification of the tiles used in the reconstruction process can also be transmitted within the bitstream. Alternatively, parameters used for the partitioning can be transmitted within the bitstream so that a decoder, such as the decoder 500, can recreate the tiles during the decoding process.

Figure 9:
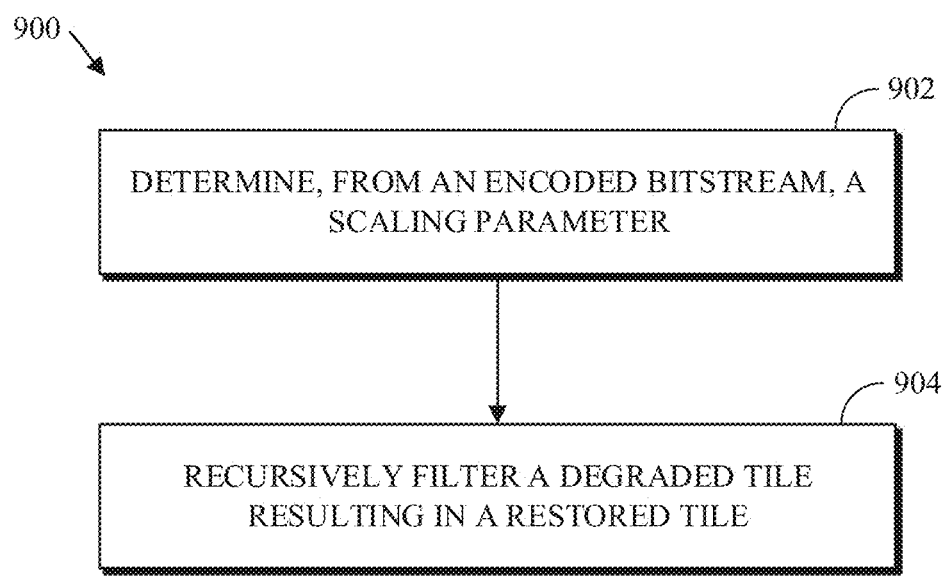
FIG. 9 is a flowchart diagram of a process for restoring a degraded frame at a decoder according to an implementation of this disclosure.

The decoder uses the restoration parameters (and the restoration type, when available), to obtain a reconstructed tile as described with respect to FIG. 9.

FIG. 9 is a flowchart diagram of a process 900 for restoring a degraded frame at a decoder according to an implementation of this disclosure. The process 900 may be performed by a decoder such as the decoder 500. For example, the process 900 can be performed in whole or in part by the loop filter stage 512 of the decoder 500. Implementations of the process 900 can be performed by storing instructions in a memory such as the memory 204 of the receiving station 106 to be executed by a processor such as processor 202, for example.

The process 900 can be implemented using specialized hardware or firmware. Some computing devices can have multiple memories, multiple processors, or both. The steps or operations of the process 900 can be distributed using different processors, memories, or both. For simplicity of explanation, the process 900 is depicted and described as a series of steps or operations. However, the teachings in accordance with this disclosure can occur in various orders and/or concurrently. Additionally, steps in accordance with this disclosure may occur with other steps not presented and described herein. Furthermore, not all illustrated steps or operations may be used to implement a method in accordance with the disclosed subject matter.

The process 900 occurs either in whole or in part after the decoder generates a degraded tile of a source frame. The degraded tile can be, for example, all or a portion of a reconstructed frame resulting from a reconstruction loop of the decoder. That is, the degraded frame can be a frame resulting from a decoder reconstruction. Again, this frame is referred to as a degraded frame so as to distinguish it from the final reconstructed frame after filtering. For example, all or a portion of the degraded frame could be received from the reconstruction stage 510 at the deblocking filtering stage 514 of the decoder 500. The decoder 500 can be arranged such that the deblocking filter stage 514 is before the loop filter stage 512. Alternatively, another filter stage may be located after the deblocking filter stage 514. In either case, the degraded frame from the reconstruction stage 414 can be deblocked before the process 900 occurs.

At 902, the process 900 determines a scaling parameter for a degraded tile from the encoded bitstream. The scaling parameter can determine how strongly edges in a degraded tile affect filtering operations as described above. In an example, the scaling parameter can be determined by decoding and dequantizing a quantized scaling factor from the header in which it was inserted. The scaling parameter can be the scaling factor s as described above. The scaling parameter can be a signal range standard deviation $\sigma_r$, from which a scaling factor can be determined as described above. In an example, determining the scaling factor can include decoding a range filter variance from the encoded bitstream and calculating the scaling factor using the range filter variance and a spatial domain filter variance. The range filter variance can be or can correspond to an optimal range standard deviation $\sigma_r$, determined by an encoder at 608 of the process 600. In an example, the spatial domain filter variance can be set to a predetermined value, such as $\sqrt{2}$.

At 904, the degraded tile is recursively filtered to generate a restored tile. Recursive filtering can be performed in accordance with the process of FIG. 7 using the current degraded tile. In an implementation, the process 900 looks up the row and column weights in a lookup table similar to that described with respect to 708 of FIG. 7. In an example, recursively filtering the degraded tile using the scaling factor can include determining weights comprising row weights and column weights using the scaling factor, performing a left-to-right filtering using the row weights, performing a right-to-left filtering using the row weights, performing a top-to-bottom filtering using the column weights, and performing a bottom-to-top filtering using the column weights.

The process 900 of FIG. 9 may be repeated as needed, e.g., if the degraded frame constitutes more than one tile, until the reconstructed frame is completed for inclusion as part of the output video stream, such as the output video stream 516 of FIG. 5.

If different restoration types are used for the frame, the restoration type for the tile may be decoded from header in which it was encoded. The process 900 occurs if the domain transform recursive filter type is indicated. If another restoration type is used, the appropriate filter (e.g., a Wiener filter or a bilateral filter) can instead be used in the reconstruction process.

The aspects of encoding and decoding described above illustrate some encoding and decoding techniques. However, it is to be understood that encoding and decoding, as those terms are used in the claims, could mean compression, decompression, transformation, or any other processing or change of data.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 102 and/or receiving station 106 (and the algorithms, methods, instructions, etc., stored thereon and/or executed thereby, including by encoder 400 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 102 and receiving station 106 do not necessarily have to be implemented in the same manner.

Further, in one aspect, for example, transmitting station 102 or receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Transmitting station 102 and receiving station 106 can, for example, be implemented on computers in a video conferencing system. Alternatively, transmitting station 102 can be implemented on a server and receiving station 106 can be implemented on a device separate from the server, such as a hand-held communications device. In this instance, transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 102. Other transmitting station 102 and receiving station 106 implementation schemes are available. For example, receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for restoring a degraded tile of a degraded frame resulting from reconstruction of a source tile, the method comprising:
   for a scaling factor of at least some scaling factors:
      domain transform recursively filtering the degraded tile, using the scaling factor, to generate a respective restored tile, wherein:
         domain transform recursively filtering the degraded tile comprises transforming, before filtering, the degraded tile from a pixel domain to a gradient domain comprising gradients of pixel values of the degraded tile,
         the scaling factor is a function of a filter variance over a spatial domain of the degraded tile and a filter variance over a range of the pixel values of the degraded tile,
         the filter variance over the range of the pixel values determines how strongly edges affect filtering operations, and
         the filter variance over the spatial domain controls a filter kernel size; and
      determining a respective error for the respective restored tile with respect to the source tile;
   selecting an optimal scaling factor from the at least some scaling factors, the optimal scaling factor corresponding to a smallest respective error; and
   encoding, in an encoded bitstream, a scaling parameter identifying the optimal scaling factor.

2. The method of claim 1, wherein the at least some scaling factors are selected by fixing one of the filter variance over a spatial domain or the filter variance over a range of the pixel values of the degraded tile and varying the other.

3. The method of claim 1, wherein domain transform recursively filtering the degraded tile comprises:
   for an iteration number of a predetermined number of iterations:
      determining row weights using the scaling factor and the iteration number;
      performing a recursive row filtering operation on rows of the degraded tile;
      determining column weights using the scaling factor and the iteration number; and
      performing a recursive column filtering operation on columns of the degraded tile.

4. The method of claim 3, wherein the predetermined number of iterations is three.

5. The method of claim 3, wherein determining the row weights comprises:
   looking up a row weight for a pixel in a lookup table using the scaling factor, a gradient at a pixel location of the pixel, and the iteration number.

6. The method of claim 3,
   wherein performing the recursive row filtering operation comprises:
      performing a left-to-right filtering using the row weights; and
      performing a right-to-left filtering using the row weights, and
   wherein performing the recursive column filtering operation comprises:
      performing a top-to-bottom filtering using the column weights; and
      performing a bottom-to-top filtering using the column weights.

7. The method of claim 1, wherein the degraded tile is co-extensive with the degraded frame.

8. An apparatus for restoring a degraded tile of a degraded frame resulting from reconstruction of a source tile, comprising:
   a processor configured to:
      transform the degraded tile from a pixel domain to a gradient domain comprising gradients of pixel values;
      after transforming the degraded tile, determine a first error with respect to the source tile, the first error corresponding to applying a domain transform recursive filter using a first scaling factor to the degraded tile;

after transforming the degraded tile, determine a second error with respect to the source tile, the second error corresponding to applying the domain transform recursive filter using a second scaling factor to the degraded tile; and encode, in an encoded bitstream, a scaling parameter that identifies one of the first scaling factor or the second scaling factor corresponding to whichever of the first error or the second error is smaller, wherein the first and second scaling factors are each a function of a filter variance over a spatial domain of the degraded tile and a filter variance over a range of the pixel values of the degraded tile, the filter variance over the range of the pixel values determines how strongly edges affect filtering operations, and the filter variance over the spatial domain controls a filter kernel size.

9. The apparatus of claim 8, wherein applying the domain transform recursive filter is performed for a predetermined number of iterations.

10. The apparatus of claim 9, wherein the predetermined number of iterations is three.

11. The apparatus of claim 8, wherein the applying the domain transform recursive filter using the first scaling factor to the degraded tile comprises instructions to:
determine weights comprising row weights and column weights using the first scaling factor;
perform a left-to-right filtering using the row weights;
perform a right-to-left filtering using the row weights;
perform a top-to-bottom filtering using the column weights; and
perform a bottom-to-top filtering using the column weights.

12. The apparatus of claim 11, wherein to determine the weights comprising the row weights and the column weights using the first scaling factor comprises to:
look up a row weight for a pixel in a lookup table using the first scaling factor and a horizontal gradient at a pixel location of the pixel; and
look up a column weight for the pixel in the lookup table using the first scaling factor and a vertical gradient at the pixel location of the pixel.

13. An apparatus for restoring a degraded tile of a degraded frame resulting from a decoder reconstruction, the apparatus comprising:
a processor configured to:
determine, from an encoded bitstream, a scaling factor by one of:
decoding a range filter variance from the encoded bitstream, and calculating the scaling factor using the range filter variance and a spatial domain filter variance, wherein the range filter variance determines how edges in the degraded tile affect filtering operations and the spatial domain filter variance controls a filter kernel size;
decoding the spatial domain filter variance from the encoded bitstream, and calculating the scaling factor using the range filter variance and the spatial domain filter variance; or
decoding the scaling factor from the encoded bitstream; and
domain transform recursively filter, resulting in a restored tile, the degraded tile using the scaling factor, wherein to domain transform recursive filter the degraded tile comprises to transform, before filtering, the degraded tile from a pixel domain to a gradient domain comprising gradients of pixel values.

14. The apparatus of claim 13, wherein the spatial domain filter variance is $\sqrt{2}$.

15. The apparatus of claim 13, wherein to domain transform recursively filter the degraded tile using the scaling factor comprises to:
determine weights comprising row weights and column weights using the scaling factor;
perform a left-to-right filtering using the row weights;
perform a right-to-left filtering using the row weights;
perform a top-to-bottom filtering using the column weights; and
perform a bottom-to-top filtering using the column weights.

16. The method of claim 1, further comprising:
setting a first size for the degraded tile based on a second size of the degraded frame.

* * * * *